Feb. 19, 1957   H. R. WARFORD   2,781,602
FISHING APPARATUS
Filed Aug. 20, 1956

INVENTOR,
HENRY R. WARFORD
BY
Weatherford & Weatherford
attys

United States Patent Office 2,781,602
Patented Feb. 19, 1957

2,781,602

FISHING APPARATUS

Henry R. Warford, Memphis, Tenn.

Application August 20, 1956, Serial No. 605,024

9 Claims. (Cl. 43—24)

This invention relates to improved apparatus for fishing. More particularly, it relates to improved line guide means for a fishing rod, with one of said means being curved to form a crook.

As is known by those familiar with the art of fishing, frequently the fishing hook becomes entangled in foreign objects from which it is practically impossible to disengage the hook, thereby generally necessitating that the line be severed. In general, the reason the fishing hook cannot be disengaged is because no leverage or twisting motion can be brought to bear on the fishhook due to the length and flexibility of the line. In the present invention means is provided for overcoming this problem so that the fishhook may be disengaged from a foreign object. Such means comprises a rigid tubular member curved to form a hollow crook and line guide having its main body portion secured adjacent the tip of the fishing rod and an integral projecting portion extending therefrom, said crook having a flared bell mouth at opposite ends thereof with the bell mouth adjacent said body portion being cut out to fit on said rod and prevent turning of the hollow crook relative to the rod. The internal diameter of the hollow crook is great enough so that the fishing line which is threaded therethrough will freely pass through the crook along with the depth guide carried by the line, but small enough so that a float will not pass therethrough.

The functioning of such means to disengage the fishhook is as follows: When the fishhook is caught on a foreign object the line is drawn in through the hollow crook until the sliding float is engaged by the bell mouth of the crook to slide the float along the line and jam the float against the weight adjacent the fishhook. After the float is so jammed the fishing rod may then be moved in the desired directions, which motion will be transmitted to the fishing hook through the rigid hollow crook, the float, and the very short section of line. Additionally, the hollow crook is useful to move reeds, logs and similar objects in the water, and to move the boat by hooking onto the logs, brush, or the like.

It is further contemplated in the present invention that additional guides be provided along the fishing pole, such additional guides being of a construction similar to that of the hollow crook or tip guide above described, except that the additional guides are not curved.

An object of the present invention is to provide improved fishing apparatus.

A further object is to provide a rigid tip guide curved to form a crook whereby the guide performs the dual function of providing an improved line guide and providing a handy hook means serving many useful purposes.

A further object is to provide such a tip guide having a flared bell mouth at each end thereof and being of such a diameter that the fishing line may be drawn therethrough until the bell mouth engages the float to slide the float along the line and jam the float against the weight adjacent the fishhook, whereby the fishing rod may be maneuvered to disengage the fishhook.

A further object is to provide such a tip guide having a cut-out portion in the bell mouth adjacent said fishing rod, whereby to fit on the rod and prevent turning of the tip guide relative to the rod.

A further object is to provide additional guides similar in construction to said tip guide, but not being curved and having a cut-out portion at both ends of the guide.

A further object is to provide the innermost guide adjacent the handle means with a longitudinal slot therein whereby the line may be secured.

A further object is generally to improve the design and construction of fishing apparatus.

The means by which the foregoing and other objects of the present invention are accomplished and the manner of their accomplishment will be readily understood from the following specification upon reference to the accompanying drawings, in which.

Figure 1:
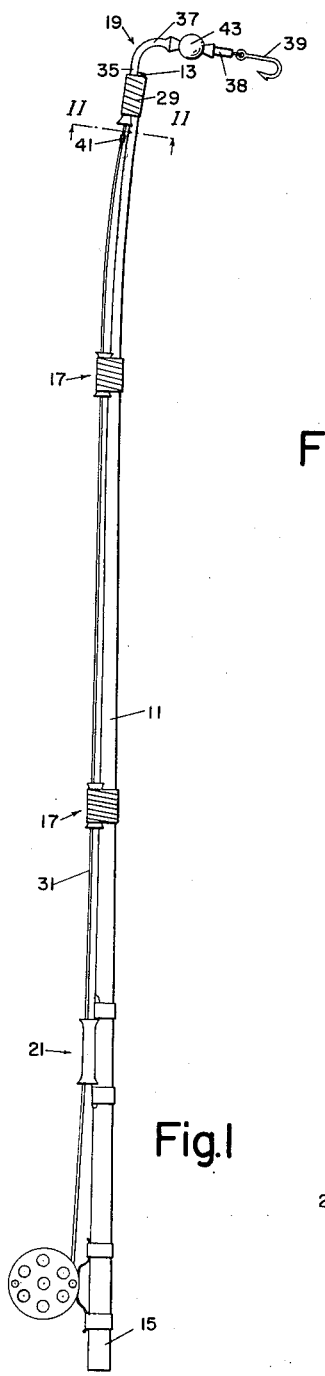
Fig. 1 is an elevational view of the fishing apparatus of the present invention as employed on a conventional fishing rod.
Figure 2:
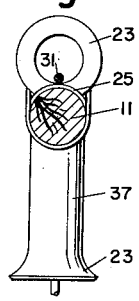
Fig. 2 is an enlarged sectional view taken as on the line II—II of Fig. 1.

Referring now to the drawings in which the various parts are indicated by numerals, the guide means of the present invention are spaced along and secured to a fishing rod 11 from a point adjacent the tip 13 of the fishing rod to a point adjacent the handle means 15 of the fishing rod. Said guide means comprises one or more intermediate guides 17, an outermost or tip guide 19 adjacent the tip 13, and an innermost guide 21 adjacent handle means 15.

Figure 3:
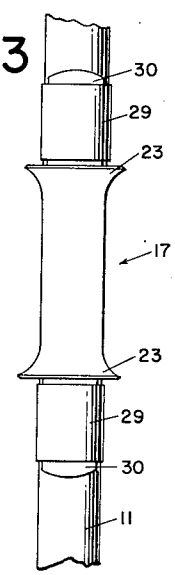
Fig. 3 is a fragmentary view on a similar scale of a section of the fishing rod illustrating an alternate means of attaching a guide to the fishing rod.
Figure 4:
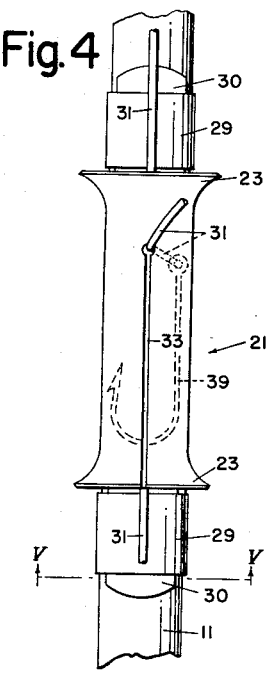
Fig. 4 is a further enlarged view of the innermost guide.
Figure 5:
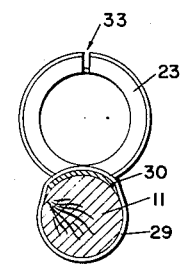
Fig. 5 is a sectional view on a similar scale taken as on the line V—V of Fig. 4.
Figure 6:
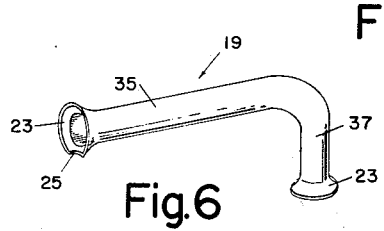
Fig. 6 is a perspective view of the preferred embodiment of tip guide.

Each of intermediate guides 17 comprises an annular and substantially cylindrical member or tube formed of a rigid material as metal, fiber, plastic or the like, and having a flared bell mouth 23 at each end thereof. The bell mouths 23 of each of guides 17 are cut-out adjacent fishing rod 11 to form an arcuate edge 25 in each of the bell mouths whereby the guides fit on the fishing rod 11 and the sharp edges 25 engage the fishing rod to prevent rotation of the guide relative to the fishing rod. Intermediate guides 17 may be secured to fishing rod 11 by any suitable means, as the straps or tape 29 illustrated in Fig. 1, which tape encircles the rod and the guides, or the guides may be provided with oppositely extending projections 30 rigidly attached at opposite ends of guides 17 and secured to the fishing rod by similar straps or tape 29 encircling the rod and the projections as illustrated in Fig. 3. Projections 30 are preferably arcuate in cross section, as illustrated in Fig. 5, whereby to fit the rod closely. The internal diameter of intermediate guides 17 is substantially greater than the diameter of the fishing line 31 which extends therethrough so as to provide for free passage of the line.

Innermost guide 21 is substantially of the same construction as intermediate guides 17, above described, except that the innermost guide is preferably longitudinally split adjacent the top side thereof from the innermost end along a substantial portion of the length thereof to provide a slot 33. Slot 33 is adapted to snugly fit line 31 whereby the line may be inserted in the slot for housing a hook 39 or other lure therein when not in use for fishing.

The outermost or tip guide 19 is substantially of the same construction as intermediate guides 17, above described, except that the tip guide is curved to form a crook having a main body portion 35 secured to rod 11 adjacent tip 13 and an integral projecting portion 37 angularly extending therefrom, preferably forming substantially a 90° angle. As intermediate guide 17, tip guide 19 is provided at opposite ends thereof with a bell mouth 23 and with an arcuate edge 25 in the bell mouth adjacent body portion 35. It will be understood that it is not necessary to have edge 25 in the other or outer bell mouth 23 of tip guide 19.

The fishing apparatus of the present invention is provided with the usual weight 38 and fishing hook 39 adjacent the end of line 31. Additionally, a conventional depth positioner 41 is slidably mounted on line 31 spaced from the fishing hook 39, and a float 43 slidably mounted on line 31 between depth positioner 41 and fishing hook 39.

The internal diameters of guides 17, 19 and 21 are substantially greater than the diameter of line 31 and depth positioner 41 for free passage of the line and positioner therethrough, and are substantially less than the diameter of float 43, the importance of which will be more apparent in the following description of the operation of the fishing apparatus of the present invention.

When fishhook 39 is caught on a foreign object line 31 is drawn in by the fisherman through the guides 17, 19 and 21 until sliding float 43 is engaged by the outer bell mouth 23 of the tip guide 19. The line 31 is then continued to be drawn in, which slides float 43 outwardly along the line and jams the float against weight 38 adjacent the fishhook. After float 43 is jammed as above described the fishing rod 11 may then be moved in the desired directions, which motion will be transmitted to fishhook 39 through tip guide 19 and float 43 whereby the fishhook may be disengaged from the foreign object. Additionally, it will be understood tip guide 19 shaped as a rigid crook is useful to move reeds, logs and similar objects in the water and to move the boat by hooking onto logs, brush, or the like.

From the foregoing it will be apparent that a useful apparatus for fishing is provided which serves as improved guide means for the fishing line, and which provide means for disengaging the fishhook when caught on a foreign object, as well as providing a handy hook means which serves many useful purposes to the fisherman.

I claim:

1. In a fishing apparatus, the combination of a fishing rod having handle means and having a tip remote therefrom, a plurality of spaced guides mounted along the length of said fishing rod extending from adjacent said tip thereof to a point adjacent said handle means, each of said guides comprising a hollow rigid tube having a flared bell mouth at each end thereof, at least one of said bell mouths on each of said guides being cut out adjacent said fishing rod to fit on said rod and prevent turning of said guides relative to said rod, a line mounted on said rod extending through said guides, the internal diameter of said guides being substantially greater than the diameter of said line for free passage of the line therethrough, the outermost one of said guides adjacent said tip being curved to form a rigid crook having a main body portion secured to the tip of said rod and an integral projecting portion extending therefrom, the innermost one of said guides adjacent said handle means being split from one end thereof along a substantial portion of the length thereof to form a longitudinal slot in said innermost guide whereby said line may be secured therein.

2. In a fishing apparatus, the combination of a fishing rod having handle means and having a tip remote therefrom, a plurality of spaced guides mounted along the length of said fishing rod extending from adjacent said tip thereof to a point adjacent said handle means, each of said guides comprising a hollow rigid tube having a flared bell mouth at each end thereof, at least one of said bell mouths on each of said guides being cut out adjacent said fishing rod to fit on said rod and prevent turning of said guides relative to said rod, a line mounted on said rod extending through said guides, the internal diameter of said guides being substantially greater than the diameter of said line for free passage of the line therethrough, the outermost one of said guides adjacent said tip being curved to form a rigid crook having a main body portion secured to the tip of said rod and an integral projecting portion extending therefrom.

3. In a fishing apparatus, the combination of a fishing rod having handle means and having a tip remote therefrom, a plurality of spaced guides mounted along the length of said fishing rod extending from adjacent said tip thereof to a point adjacent said handle means, each of said guides comprising a hollow rigid tube having a flared bell mouth at each end thereof, at least one of said bell mouths on each of said guides being cut out adjacent said fishing rod to fit on said rod and prevent turning of said guides relative to said rod, the outermost one of said guides adjacent said tip being curved to form a rigid crook having a main body portion secured to the tip of said rod and an integral projecting portion extending therefrom.

4. In a fishing apparatus, the combination of a fishing rod, a rigid annular tip guide mounted on said fishing rod adjacent the tip thereof, said tip guide being curved to form a hollow rigid crook having a main body portion secured adjacent the tip of said rod and an integral projecting portion angularly extending therefrom, the opposite ends of said hollow crook being flared out to provide a bell mouth at each end thereof, the bell mouth adjacent the main body portion being cut out adjacent said fishing rod to fit said rod and prevent turning of the hollow crook relative to the rod, a line mounted on said rod extending through said hollow crook and being provided with a fishhook adjacent the end thereof, a depth positioner mounted on said line and spaced from the end thereof, a float slidably mounted on said line between said depth positioner and said fishhook, the internal diameter of said hollow crook being substantially greater than the diameter of said line and said depth positioner for free passage of the line and positioner therethrough and being substantially less than the diameter of said float whereby the line with the positioner is adapted to be drawn through said hollow crook so that the bell mouth adjacent said projecting portion engages the float to move the float adjacent the fishhook and provide means for disengaging said fishhook when caught on a foreign object.

5. In a fishing apparatus, the combination of a fishing rod, a tip guide secured to said fishing rod adjacent the tip thereof, said tip guide comprising a hollow rigid tube curved to form a hollow rigid crook having the outer end extending angularly from the fishing rod, the end of the crook adjacent the extending portion thereof being provided with a flared bell mouth, a line mounted on said rod extending through said hollow rigid crook and being provided with a fishhook adjacent the end thereof, a depth positioner mounted on said line and spaced from the end thereof, a float slidably mounted on said line between said depth positioner and said hollow crook, the internal diameter of said hollow crook being substantially greater than the diameter of said line and said depth positioner for free passage of the line and positioner therethrough and being substantially less than the diameter of said float whereby the line with the positioner is adapted to be drawn through said hollow crook so that the bell mouth adjacent said projecting portion engages the float to move the float adjacent the fishhook and provide means for disengaging said fish hook when caught on a foreign object.

6. In a fishing apparatus, the combination of a fishing rod, a rigid annular tip guide mounted on said fishing rod adjacent the tip thereof, said tip guide being curved to form a hollow rigid crook having a main body portion secured adjacent the tip of said rod and an integral projecting portion angularly extending therefrom, the opposite ends of said crook being flared out to provide a bell mouth at each end thereof, the bell mouth adjacent the main body portion being cut out adjacent said fishing rod to fit said rod and prevent turning of the crook relative to the rod, and a line mounted on said rod extending through said tip guide and being provided with a fishhook adjacent the end thereof.

7. In a fishing apparatus, the combination of a fishing rod having handle means and having a tip remote therefrom, a plurality of spaced guides mounted along the length of said fishing rod extending from adjacent said tip thereof to a point adjacent said handle means, each of said guides comprising a hollow rigid tube having a flared bell mouth at each end thereof, at least one of said bell mouths on each of said guides being cut out adjacent said fishing rod to fit on said rod and prevent turning of said guides relative to said rod, a line mounted on said rod extending through said guides and being provided with a fishhook at the end thereof, a depth positioner mounted on said line and spaced from the end thereof, a float slidably mounted on said line between said depth positioner and said hook, the outermost one of said guides adjacent said tip being curved to form a rigid crook having a main body portion secured to the tip of said rod and an integral projecting portion angularly extending therefrom, the internal diameter of said guides being substantially greater than the diameter of said line and said depth positioner for free passage of the line and positioner therethrough and being substantially less than the diameter of said float whereby the line with the positioner is adapted to be drawn through said guides so that the flared bell mouth of the outermost one of said guides engages the float to move the float adjacent the fishhook and provide means for disengaging said fishhook when caught on a foreign object, the innermost one of said guides adjacent said handle means being split from one end thereof along a substantial portion of the length thereof to form a longitudinal slot in said innermost guide whereby said line may be secured therein.

8. In a fishing apparatus, the combination of a fishing rod having handle means and having a tip remote therefrom, a plurality of spaced guides mounted along the length of said fishing rod extending from adjacent said tip thereof to a point adjacent said handle means, each of said guides comprising a hollow rigid tube having a flared bell mouth at each end thereof, at least one of said bell mouths on each of said guides being cut out adjacent said fishing rod to fit on said rod and prevent turning of said guides relative to said rod, a line mounted on said rod extending through said guides and being provided with a fishhook at the end thereof, a depth positioner mounted on said line and spaced from the end thereof, a float slidably mounted on said line between said depth positioner and said hook, the outermost one of said guides adjacent said tip being curved to form a rigid crook having a main body portion secured to the tip of said rod and an integral projecting portion angularly extending therefrom, the internal diameter of said guides being substantially greater than the diameter of said line and said float positioner for free passage of the line and positioner therethrough and being substantially less than the diameter of said float whereby the line with the positioner is adapted to be drawn through said guides so that the flared bell mouth of the outermost one of said guides engages the float to move the float adjacent the fishhook and provide means for disengaging said fishhook when caught on a foreign object.

9. In a fishing apparatus, the combination of a fishing rod having a handle portion and having a tip remote therefrom, a guide mounted on said fishing rod adjacent said tip, said guide comprising a hollow rigid tube having a flared bell mouth at each end thereof, at least one of said bell mouths being cut out adjacent said fishing rod to fit on said rod and prevent turning of said guide relative to said rod, said guide being curved to form a rigid crook having a main body portion secured to the tip of said rod and an integral projecting portion extending therefrom.

References Cited in the file of this patent

UNITED STATES PATENTS

| | | |
|---|---|---|
| 1,401,096 | Neudeck | Dec. 20, 1921 |
| 2,652,654 | Bahn | Sept. 22, 1954 |